(12) United States Patent
Lindhuber et al.

(10) Patent No.: US 11,192,550 B2
(45) Date of Patent: Dec. 7, 2021

(54) METHOD, COMPUTER-READABLE MEDIUM, SYSTEM, AND VEHICLE COMPRISING SAID SYSTEM FOR SUPPORTING ENERGY-EFFICIENT DECELERATION OF THE VEHICLE

(71) Applicant: Bayerische Motoren Werke Aktiengesellschaft, Munich (DE)

(72) Inventors: Stefan Lindhuber, Neu-Esting (DE); Mark Van Gelikum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 237 days.

(21) Appl. No.: 16/412,330

(22) Filed: May 14, 2019

(65) Prior Publication Data

US 2019/0263406 A1 Aug. 29, 2019

Related U.S. Application Data

(63) Continuation of application No. PCT/EP2017/075285, filed on Oct. 5, 2017.

(30) Foreign Application Priority Data

Nov. 18, 2016 (DE) ...................... 10 2016 222 734.3

(51) Int. Cl.
*B60W 30/18* (2012.01)
*B60W 50/00* (2006.01)
*B60W 50/14* (2020.01)

(52) U.S. Cl.
CPC .. *B60W 30/18072* (2013.01); *B60W 50/0097* (2013.01); *B60W 50/14* (2013.01);
(Continued)

(58) Field of Classification Search
CPC ................. B60W 30/00; B60W 30/18; B60W 30/18009; B60W 30/18072; B60W 50/00;
(Continued)

(56) References Cited

U.S. PATENT DOCUMENTS

| | | | | |
|---|---|---|---|---|
| 8,712,676 B2* | 4/2014 | Hiestermann | ...... | G01C 21/3469 701/119 |
| 2014/0058673 A1* | 2/2014 | Wolf | .................. | G01C 21/3484 701/533 |

(Continued)

FOREIGN PATENT DOCUMENTS

| | | |
|---|---|---|
| CN | 101945786 A | 1/2011 |
| CN | 103813925 A | 5/2014 |

(Continued)

OTHER PUBLICATIONS

PCT/EP2017/075285, International Search Report dated Mar. 19, 2018 (Three (3) pages).

(Continued)

*Primary Examiner* — Geepy Pe
*Assistant Examiner* — Michael Allen Brace, Jr.
(74) *Attorney, Agent, or Firm* — Crowell & Moring LLP (57) ABSTRACT

A method for supporting energy-efficient deceleration of a vehicle includes determining a reference deceleration depending on a current speed or a speed profile of the vehicle, determining a starting time point and a starting speed of a deceleration of the vehicle, and determining a real energy consumption and a real distance between the starting time point and a current time point and/or ending time point of the deceleration. The method also includes calculating a reference time and a reference distance for a deceleration with the determined reference deceleration between the determined starting speed and the current speed and/or the speed at the ending time point of the vehicle, calculating an (Continued)

energy consumption for a differential distance from the determined real distance and the calculated reference distance, and calculating a real total energy consumption as the sum of the determined real energy consumption of the deceleration and the calculated energy consumption for the differential distance. Further, the method includes calculating a reference energy consumption for the reference deceleration from the starting speed to the current and/or ending speed depending on a predefined deceleration type of the reference deceleration and/or depending on the determined real energy consumption of the deceleration, and then providing an energy-saving potential on the basis of a difference between the real total energy consumption and the calculated reference energy consumption.

15 Claims, 2 Drawing Sheets

(52) U.S. Cl.
CPC ........... *B60W 2030/1809* (2013.01); *B60W 2030/18081* (2013.01); *B60W 2400/00* (2013.01); *B60W 2520/10* (2013.01); *B60W 2540/12* (2013.01); *B60W 2552/15* (2020.02); *B60W 2720/106* (2013.01); *Y02T 10/40* (2013.01); *Y02T 10/84* (2013.01)

(58) Field of Classification Search
CPC .. B60W 50/08; B60W 50/14; B60W 50/0097; B60W 2552/00; B60W 2552/15; B60W 2030/18081; B60W 2030/1809; B60W 2400/00; B60W 2520/00; B60W 2520/10; B60W 2540/00; B60W 2540/12; B60W 2720/00; B60W 2720/10; B60W 2720/106; Y02T 10/00; Y02T 10/10; Y02T 10/40; Y02T 10/80; Y02T 10/84
See application file for complete search history.

(56) References Cited

U.S. PATENT DOCUMENTS

| | | | |
|---|---|---|---|
| 2015/0232099 A1* | 8/2015 | Miller | B60W 50/14 701/70 |
| 2016/0101780 A1* | 4/2016 | Park | B60W 50/14 701/70 |
| 2016/0176413 A1* | 6/2016 | Oguri | B60W 20/14 701/22 |
| 2016/0375775 A1* | 12/2016 | Imanishi | B60L 7/24 701/70 |
| 2017/0038222 A1* | 2/2017 | Meyer | G01C 21/3697 |
| 2018/0057001 A1* | 3/2018 | Hu | B60W 10/11 |
| 2018/0118193 A1* | 5/2018 | Zhao | B60W 30/18127 |

FOREIGN PATENT DOCUMENTS

| | | |
|---|---|---|
| CN | 106004857 A | 10/2016 |
| DE | 10 2008 045 811 A1 | 4/2009 |
| DE | 10 2009 031 085 A1 | 4/2010 |
| DE | 10 2009 054 080 A1 | 5/2011 |
| DE | 10 2011 119 007 A1 | 5/2013 |
| DE | 10 2012 213 229 A1 | 1/2014 |
| DE | 10 2012 013 509 A1 | 5/2014 |
| DE | 10 2014 222 140 A1 | 5/2016 |
| EP | 2 460 708 A2 | 6/2012 |

OTHER PUBLICATIONS

German Search Report issued in German counterpart application No. 10 2016 222 734.3 dated Jul. 17, 2017, with Statement of Relevancy (Eight (8) pages).

English-language Chinese Office Action issued in Chinese application No. 201780057331.0 dated Jun. 23, 2021 (Seven (7) pages).

* cited by examiner

METHOD, COMPUTER-READABLE MEDIUM, SYSTEM, AND VEHICLE COMPRISING SAID SYSTEM FOR SUPPORTING ENERGY-EFFICIENT DECELERATION OF THE VEHICLE

CROSS REFERENCE TO RELATED APPLICATIONS

This application is a continuation of PCT International Application No. PCT/EP2017/075285, filed Oct. 5, 2017, which claims priority under 35 U.S.C. § 119 from German Patent Application No. 10 2016 222 734.3, filed Nov. 18, 2016, the entire disclosures of which are herein expressly incorporated by reference.

BACKGROUND AND SUMMARY OF THE INVENTION

The invention relates to a method for supporting an energy-efficient deceleration of a vehicle and for calculating an energy-saving potential on the basis of an inefficient deceleration. The invention furthermore relates to a computer-readable medium, a system and a vehicle comprising the system for supporting an energy-efficient deceleration of the vehicle.

It is known that vehicles can comprise various driver assistance systems that support the driver in the deceleration of the vehicle. A deceleration assistant can, for example, inform a driver of whether he can reach a traffic light while it is still green, or whether he should already reduce the speed. Performing a driving-style analysis of a driver in accordance with qualitative criteria is further known.

It is therefore an object of the invention to enable a quantitative energy consumption evaluation of a deceleration of a vehicle efficiently. It is, in particular, an object of the invention to provide a quantitative energy-saving potential of a deceleration of a vehicle flexibly and efficiently.

According to a first aspect, the invention is characterized by a method for supporting an energy-efficient deceleration of a vehicle. The method comprises a determination of a reference deceleration depending on a current speed of the vehicle and, optionally, of a gradient. The method can be carried out on a control device of the vehicle, and/or a simulation computer and/or a back-end service. The method can be carried out in real time during deceleration of the vehicle. The method can alternatively be carried out after a deceleration of the vehicle has occurred. The energy-efficient reference deceleration, in particular a magnitude of the reference deceleration, can be recorded or stored on a control device of the vehicle, for example depending on the speed and the roadway gradient. A stored reference deceleration can be read out of the memory of the control device, depending on the current speed of the vehicle.

The method furthermore comprises a determination of a starting time point $t_{Start}$ and a starting speed $v_{Start}$ of a deceleration of the vehicle. The method further comprises a determination of a real energy consumption and a real distance between the starting time point and the current time point of the deceleration. The real energy consumption can, for example, be the quantity of fuel consumed or of electrical energy consumed. The real distance is the distance covered during the deceleration procedure of the vehicle.

The method comprises a calculation of a reference time and a reference distance for a deceleration with the determined reference deceleration between the determined starting speed and the determined current speed. The reference time is the time required for a deceleration of the vehicle with the reference deceleration. The reference distance is the distance required for a deceleration with the reference deceleration. In an inefficient deceleration, the reference deceleration determined is lower than the real deceleration of the vehicle, so that the reference time of the reference deceleration and the reference distance of the reference deceleration are longer in comparison with the time and the distance of the real deceleration. The method further comprises a calculation of an energy consumption of a constant-speed travel with a starting speed $v_{Start}$ for a differential distance from the determined real distance and the calculated reference distance. In order to make the energy consumption of a real deceleration and of a reference deceleration comparable, the energy consumption for the real deceleration and that of the reference deceleration are to be determined for the same distance covered. The differential distance results from the reference deceleration being less than the real deceleration, and the distance of the reference deceleration thereby being longer than the distance of the real deceleration. Through the calculation of the energy consumption for the differential distance, the energy consumption of the real deceleration and of the reference deceleration for the same distance covered can be given.

The method comprises a calculation of a real total energy consumption as the sum of the determined real energy consumption of the deceleration and of the calculated energy consumption for the differential distance, and a calculation of a reference energy consumption for the reference deceleration, for example depending on the determined real energy consumption of the deceleration. The reference energy consumption can, for example, be calculated in that the real energy consumption is scaled in accordance with the longer deceleration duration. The reference consumption can, alternatively, be determined through an idling consumption, if relevant, and the energy requirement of auxiliary equipment.

The method comprises a provision of a quantitative energy-saving potential on the basis of a difference between the real total energy consumption and the calculated reference energy consumption. The energy-saving potential can be given absolutely or relatively. The provision of the energy-saving potential can comprise an output of the energy-saving potential on a display device and/or output interface of the vehicle. The provision of the energy-saving potential can further comprise a transmission of the energy-saving potential to one or a plurality of control devices and/or simulation computers and/or to a back-end service.

Advantageously, the energy-saving potential can be determined quantitatively for each deceleration of the vehicle with a real deceleration above the reference deceleration. A journey with the vehicle can thus be evaluated objectively in terms of its efficiency during decelerations. The accuracy of the energy-saving potential can furthermore be efficiently increased in that the real energy consumption and the reference energy consumption are calculated with reference to the same distance covered. The driver of a vehicle can receive a possible energy-saving potential during the deceleration procedure, for example at a current point in time of a deceleration procedure, and appropriately adjust the subsequent decelerations of the vehicle in order to decelerate the vehicle energy-efficiently. An inefficient deceleration of a vehicle can thus be recognized and communicated to the driver. The energy saved can, for example, lead to an increase in the range of the vehicle that the driver can use in order to reach a journey destination without additional charging or refueling stops. The driver can, furthermore, continuously learn how the vehicle can be decelerated efficiently, and how much energy can be saved in that way. The driving style of the driver can thus be determined and evaluated quantitatively and objectively.

According to an advantageous embodiment, the speed-dependent reference deceleration can be corrected depending on the current gradient of the roadway. A dynamic adaptation of the reference deceleration can take place in this way, so that the energy consumption of the reference deceleration, and thereby the energy-saving potential, can be calculated more precisely.

According to a further advantageous embodiment, the reference energy consumption can be determined for one of the following, predefined deceleration types of the reference deceleration: a reference deceleration of a coasting procedure with an engaged drive of the vehicle, preferably taking the idling consumption into account, a reference deceleration of a coasting procedure with a disengaged drive of the vehicle, a reference deceleration with a propulsion cut-off of the drive of the vehicle, and/or a reference deceleration with recovery of kinetic energy into a store internal to the vehicle. In addition or alternatively, the reference energy consumption can be determined through a temporal scaling of the energy consumption of the real deceleration. Different deceleration procedures can thus be considered efficiently, and the excess energy consumption, or the possible energy-saving potential, with respect to the efficient reference deceleration procedures can be determined quantitatively.

According to a further advantageous embodiment, the current time point can be an ending time point $t_{Ende}$ of the deceleration, the current speed can be an ending speed $v_{Ende}$ of the deceleration, and/or the current time point and the current speed can be determined until the ending time point of the deceleration and the ending speed of the deceleration are reached. The energy-saving potential for a complete deceleration procedure between the starting time point and the ending time point and between the starting speed and the ending speed can be determined in this way. For an efficient calculation, for example in the vehicle, it is for example possible for a calculation of the reference energy consumption only to take place once when the ending speed is reached, so that a repeated calculation of the reference energy consumption can be avoided.

According to a further advantageous embodiment, for calculation of the energy-saving potential the starting time point of the deceleration can be a point in time at which the determined reference deceleration is first exceeded for a predefined time interval, the starting time point of deceleration can be the point in time at which an actuation of a brake of the vehicle is captured, and/or the starting speed can be the current speed of the vehicle at the starting time point of the deceleration. The calculation of the energy-saving potential can, in this way, be efficiently restricted to decelerations of the vehicle that lie above the corresponding reference deceleration and that last for a certain, predefined time. The calculation of the energy-saving potential can, furthermore, be performed depending on further conditions such as, for example, the simultaneous actuation of the brake of the vehicle.

According to a further advantageous embodiment, the energy consumption of the differential distance can be calculated for a constant-speed travel with the determined starting speed. The comparability of the energy consumption of the real deceleration and the reference deceleration is hereby enabled. Both the energy consumption of the real deceleration and the reference energy consumption can be compared on the basis of the same distance covered, in that the energy consumption of a constant-speed travel with the starting speed of the deceleration for the differential distance is taken into account. A slight deceleration can therefore lead to a lower energy requirement, since, to reach the same distance-related destination point, the deceleration must be initiated earlier, i.e. the preceding, significantly more energy-intensive constant-speed travel or acceleration is not present for so long.

According to a further advantageous embodiment, the method can further comprise a provision of a deceleration suggestion, wherein the deceleration suggestion preferably contains a deceleration target, to a driver of the vehicle, and a determination of a starting time point and an ending time point of the deceleration suggestion. The deceleration suggestion can be a message or a signal that communicates to the driver of the vehicle that he should execute a predetermined deceleration. If the driver of the vehicle ignores the deceleration suggestion that has been provided, the method can comprise a determination of a real energy consumption between the starting time point of the deceleration suggestion and the ending time point of the deceleration suggestion, a determination of a reference energy consumption of a reference deceleration depending on the deceleration suggestion, a calculation of a differential energy consumption between the real energy consumption and the reference energy consumption, and thus a provision of an energy-saving potential for the deceleration suggestion provided making use of the calculated differential energy consumption. If a driver of the vehicle carries out the deceleration given in the deceleration suggestion, he can decelerate the vehicle efficiently. Failing to observe or ignoring the deceleration suggestion provided can lead to an inefficient deceleration that can entail an excess energy consumption. Advantageously, an energy-saving potential for the failure to observe deceleration suggestions can be calculated efficiently and/or provided to the driver of the vehicle. In addition, the energy quantity saved that results from a more efficient deceleration, for example as a result of following deceleration suggestions as compared with a defined reference deceleration, can be calculated.

According to a further advantageous embodiment, the ending time point of the deceleration suggestion can be the point in time at which the deceleration target of the deceleration suggestion is reached. The ending time point of the calculation of the energy-saving potential can be determined flexibly in this way.

According to a further aspect, the invention is characterized by a computer-readable medium for supporting an energy-efficient deceleration of a vehicle, wherein the computer-readable medium comprises instructions which, when executed on a control device, carry out the method described above.

According to a further aspect, the invention is characterized by a driver assistance system for supporting an energy-efficient deceleration of a vehicle. The driver assistance system comprises a control device and an energy consumption assistant which is executed on the control device, wherein the energy consumption assistant is designed to carry out the method described above.

According to a further aspect, the invention is characterized by a vehicle comprising the driver assistance system described above.

Further features of the invention emerge from the claims, the figures and the description of the figures. All of the features and feature combinations referred to above in the description, as well as the features and feature combinations referred to below in the description of the figures and/or only shown in the figures, are applicable not only in the respectively given combination, but also in other combinations or else alone.

Other objects, advantages and novel features of the present invention will become apparent from the following detailed description of one or more preferred embodiments when considered in conjunction with the accompanying drawing.

BRIEF DESCRIPTION OF THE DRAWING

At least one embodiment of the invention is described below with reference to the appended drawings.

DETAILED DESCRIPTION OF THE DRAWING

Figure 1:
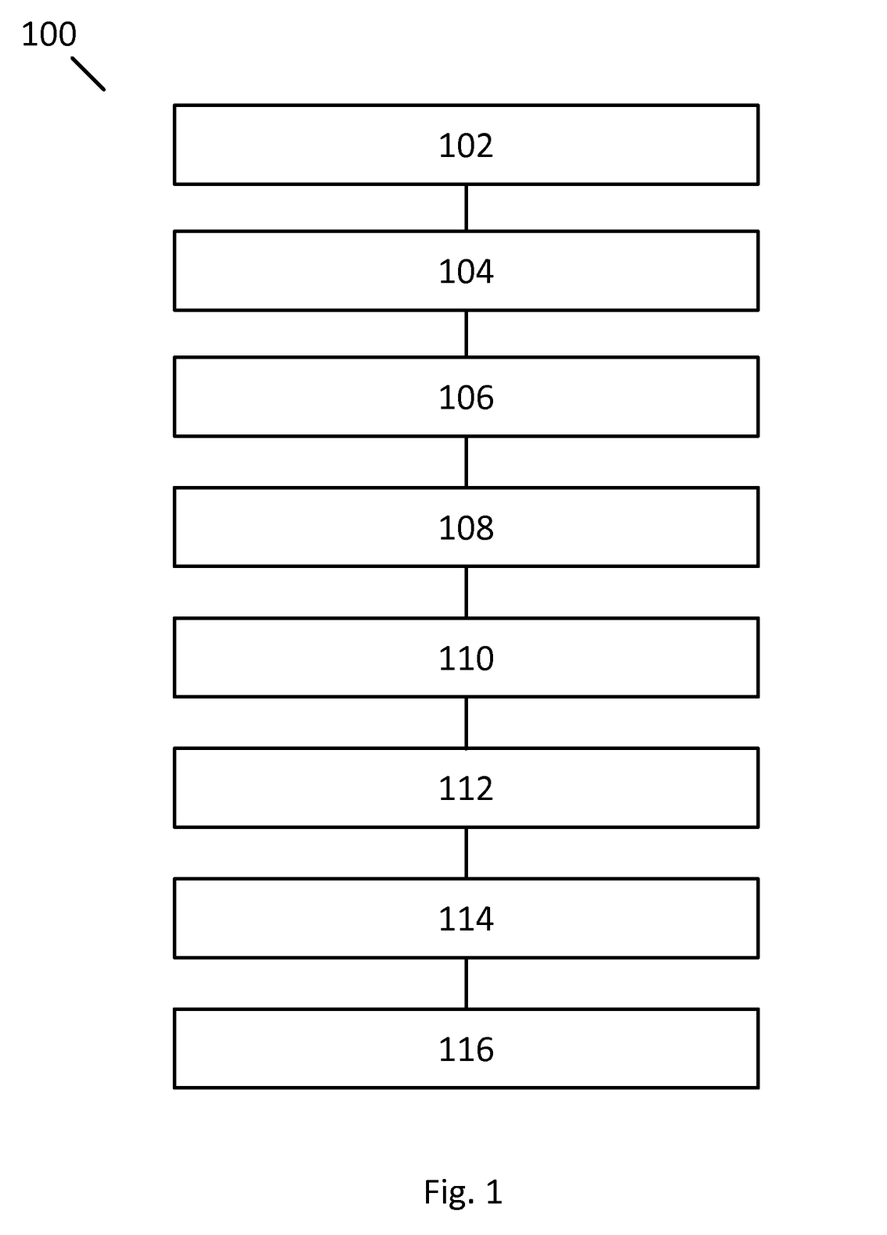
FIG. 1 schematically illustrates a method according to at least one embodiment and FIG. 2 schematically illustrates a vehicle according to at least one embodiment.
Figure 2:
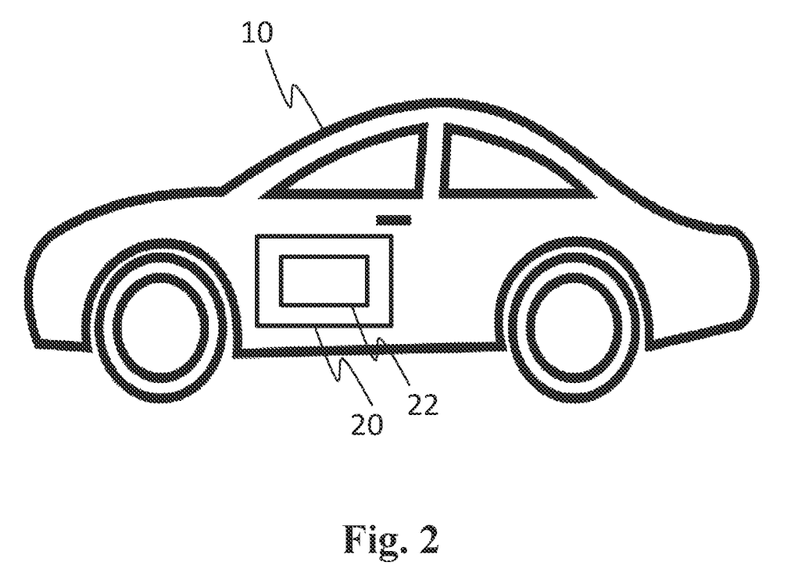

The method described in FIG. 1 can be carried out in real time or, alternatively, after the completion of the deceleration and/or the completion of a journey. The method can be carried out by an energy consumption assistant 22 executed on a control device 20 of the vehicle 10 (FIG. 2). The method can determine an excess energy consumption due to an inefficient deceleration compared to an efficient reference deceleration, and can give an energy-saving potential that results in comparison with the efficient reference deceleration. The reasons for an inefficient deceleration can, for example, be inefficient deceleration magnitudes and/or deceleration suggestions that the driver of the vehicle ignores or does not follow.

In addition to the calculation of a quantitative energy-saving potential, the method can also calculate a quantitative energy saving. In the calculation of the quantitative energy saving, the real deceleration magnitude lies below the reference deceleration magnitude. It is thus possible to calculate the energetic advantage that has resulted from a more efficient deceleration than the defined speed-dependent and, if relevant, gradient-dependent reference deceleration. The calculation of the quantitative energy saving is made similarly to the calculation of the energy-saving potential, with the difference that in the calculation of the quantitative energy saving, starting and stopping conditions are to be adjusted, and that the real deceleration is longer than the reference deceleration. To compensate for the different distances, therefore, the reference deceleration is now to be extended by a theoretical constant-speed travel with $v_{Start}$ instead of the real deceleration. The calculation of the quantitative energy-saving potential described below can thus also be applied to the calculation of the quantitative energy saving with the differences described above.

FIG. 1 shows a method 100 for supporting an energy-efficient deceleration of a vehicle. The method in particular comprises a calculation of an energy-saving potential when a reference deceleration magnitude $Kr_{Pot,Verz}$ is exceeded and/or a calculation of an energy-saving potential when a deceleration suggestion $Kr_{Pot,VZA}$ is ignored. Both energy-saving potentials, the energy-saving potential when a reference deceleration magnitude $Kr_{Pot,Verz}$ is exceeded and the energy-saving potential when a deceleration suggestion $Kr_{Pot,VZA}$ is ignored, can be added together in order to calculate a total energy-saving potential $Kr_{Pot}$: $Kr_{Pot} = Kr_{Pot,Verz} + Kr_{Pot,VZA}$. The total energy-saving potential can be calculated for each deceleration for only one of the two energy-saving potentials. If, for example, a vehicle does not have a driver assistance system that can provide deceleration suggestions for a driver, the total energy-saving potential is the same as the energy-saving potential when a reference deceleration magnitude is exceeded. The two energy-saving potentials can thus be provided separately from one another, or can be combined into a total energy-saving potential.

The calculation of an energy-saving potential $Kr_{Pot,Verz}$ analyses decelerations in which a reference deceleration magnitude has been exceeded for a specified time. The energy-saving potential corresponds to an excess energy consumption that results through a deceleration with the reference deceleration at a constant speed delta. This excess energy consumption can be saved if the driver of the vehicle decelerates with the reference deceleration. For decelerations below the reference decelerations, the quantitative energy saving corresponds to the resulting quantity of energy saved in comparison with a deceleration with the reference deceleration magnitude. In a vehicle with a combustion engine, the energy-saving potential can indicate an excess fuel consumption. In a vehicle with an electric drive, the energy-saving potential can indicate an excess consumption of electrical energy, or a saving of the same. A deceleration of the vehicle with the reference deceleration can be realized by a driver of the vehicle. The reference deceleration can be defined depending on the speed and/or the gradient.

If, during a journey with the vehicle, the driver exceeds a specified reference deceleration, a control device of the vehicle can automatically calculate an energy-saving potential for this section of the journey. The control device can carry out the calculation of the energy-saving potential in real time, so that the driver of the vehicle has the energy-saving potential of the current deceleration to be achieved in comparison with the corresponding reference deceleration displayed to him during the deceleration of the vehicle, and has the possibility of adjusting the current deceleration of the vehicle to the more efficient reference deceleration. The control device can, for example, calculate current values of the energy-saving potential on the segment of the deceleration traveled up to the current point in time, and provide them to the driver. To increase the computing efficiency, the control device calculates the energy-saving potential on the completion of the inefficient deceleration retrospectively for the driving maneuver under consideration, for example when the deceleration magnitude has fallen again below the reference deceleration magnitude. The real energy consumption, however, is preferably already to be taken into account starting from the exceeding of the reference deceleration.

In addition, the calculation of the energy-saving potential of a deceleration by the control device can be carried out depending on one or a plurality of specified, vehicle-specific parameters and/or events: for example, the calculation of the energy-saving potential of a deceleration can be started if:

the magnitude of the current deceleration for a specified time interval, e.g. for at least 0.5 seconds, lies above the magnitude of the speed-dependent and/or gradient-dependent reference deceleration;

the speed of the vehicle lies above a specified threshold value, e.g. above 10 km/h;

a deceleration suggestion is not provided and/or not shown to the driver;

no other calculation of an energy-saving potential, e.g. a calculation of an energy-saving potential for a deceleration suggestion $Kr_{Pot,VZA}$, is being carried out by the control device.

The method 100 can first determine 102 a reference deceleration, preferably depending on a current speed of the vehicle. For this purpose a predefined reference deceleration can be stored on the control device of the vehicle on which the calculation is carried out, and can be used as a reference for the calculation of the energy-saving potential of a deceleration. For example, a table giving the reference deceleration depending on a current speed can be stored on the control device:

| $v_{Ist}$ [km/h] | 0 | 50 | 100 | 150 | 200 | 250 |
|---|---|---|---|---|---|---|
| $a_{Ref,Verz}$ [m/s²] | −1 | −1.1 | −1.6 | −2 | −2.4 | −2.4 |

The stored reference deceleration can, furthermore, be adjusted or corrected in order to take the current gradient of the roadway, and with that the component of gravitational acceleration along the roadway, into account. Limits both for the size of the correction value and also for the resulting corrected reference acceleration can additionally be specified in order to prevent deceleration magnitudes that are implausible, too large or too small.

The corrected reference deceleration can, for example, be determined as follows by the control device of the vehicle:

$$a_{Ref,Verz,korr} = \min\left[-0.5 \text{ m/s}^2; \max\left[\begin{array}{c} -3.5 \text{ m/s}^2; a_{Ref,Verz} + \\ \min\left(\max\left(\begin{array}{c} 9.81 \text{ m/s}^2 * \sin(\alpha_{St}); \\ -1.5 \text{ m/s}^2 \end{array}\right); 1.5 \text{ m/s}^2\right) \end{array}\right]\right]$$

where $\alpha_{St}$ is the current gradient of the roadway in degrees.

After the determination 102 of a reference deceleration, the method 100 can determine 104 a starting time point $t_{Start,Verz}$ and a starting speed $v_{Start,Verz}$ of a deceleration of the vehicle. The starting time point $t_{Start,Verz}$ can, for example, be determined as the point in time at which the reference deceleration $a_{Ref,Verz}$, or the corrected reference deceleration $a_{Ref,Verz,korr}$, is exceeded. For example, the starting time point $t_{Start,Verz}$ can be determined as the point in time at which the reference deceleration $a_{Ref,Verz}$, or the corrected reference deceleration $a_{Ref,Verz,korr}$, is first continuously exceeded for a specified period of time, e.g. 0.5 seconds, when the brake pedal is actrated at the same time.

The method 100 can, furthermore, determine a real energy consumption and determine 106 a real distance traveled $S_{Real,Verz}$ between the starting time point and the current time point or the ending time point of the deceleration. The current time point and the current speed can correspond to an ending time point $t_{Ende,Verz}$ and an ending speed $v_{Ende,Verz}$, if, for example, the deceleration of the vehicle undershoots the reference deceleration again. Alternatively, the ending time point $t_{Ende,Verz}$ can, for example, be determined as the point in time at which the magnitude of the reference deceleration $a_{Ref,Verz,korr}$ has again been continuously undershot for a defined time interval, e.g. 0.5, 0.6, 0.7, 0.8, 0.9, 1.0, 1.1, . . . seconds and/or an actuation of the brake pedal has no longer occurred and/or the current speed of the vehicle falls below a defined threshold value, e.g. 10 km/h. The control device can determine the ending speed $v_{Ende,Verz}$ at the respective ending time point $t_{Ende,Verz}$. The real energy consumption can, for example, be the real fuel consumption and/or the real electrical energy consumption. The real energy consumption during the deceleration can, for example, be calculated in that the control device integrates the actual energy consumption, e.g. the actual fuel consumption $Kr_{Einspr,Verz}$ [I] between the starting time point of the deceleration and the current time point of the deceleration or the ending time point of the deceleration. The real distance $S_{Real,Verz}$ during which the magnitude of the reference deceleration $a_{Ref,Verz,korr}$ is exceeded can be calculated by the control device, for example using sensors of the vehicle, e.g. making use of an acceleration sensor, GPS sensor or a wheel rotation speed transducer.

The method 100 can furthermore calculate 108 a reference time $\Delta t_{Ref,Verz}$ and a reference distance $S_{Ref,Verz}$ for the deceleration with the determined reference deceleration magnitude $a_{Ref,Verz,korr}$ between the starting speed $v_{Start,Verz}$ and the ending speed $v_{Ende,Verz}$. For example, the reference distance $S_{Ref,Verz}$ can be calculated by the control device by means of an integral over the course of the reference deceleration:

$$S_{Ref,Verz} = \int_{t_{Start}}^{t_{Ende}} v_{Fzg,Ist} * \frac{a_{Fzg,Ist}}{a_{Ref,Verz,korr}(v_{Fzg,Ist})} dt$$

where:
$v_{Fzg,Ist}$: current vehicle speed in m/s; and
$a_{Fzg,Ist}$: current vehicle acceleration in m/s².

The method can calculate 110 an energy consumption for a differential distance from the distances $S_{Ref,Verz}$ and $S_{Real,Verz}$. For the calculation of the energy consumption of the differential distance, it can be assumed that it has been traveled with a constant starting speed $v_{Start,Verz}$ before the onset of the deceleration by the vehicle. The energy consumption, e.g. the fuel consumption for such an "unnecessary" theoretical constant-speed travel represents a possible energy-saving potential, since the deceleration was initiated too late and, as a result, the deceleration was carried out with a deceleration magnitude above the deceleration magnitude of the reference deceleration. The energy consumption for the theoretical constant-speed travel can be estimated by the control device. For the estimation of the energy consumption of the constant-speed travel, predefined consumption tables, for example, can be stored on the control device, or an energy consumption model of the vehicle can be used with which the energy consumption can be estimated, depending on vehicle parameters.

The real total energy consumption of a deceleration can be calculated 112 as the sum of the real energy consumption of the deceleration and of the energy consumption for the differential distance. The calculation of the real total energy consumption, including the consumption for the unnecessary, theoretical constant-speed travel, is necessary in order to establish comparability with the reference consumption of the efficient reference deceleration on the basis of the same distance covered.

For the case in which the energy consumption corresponds to a fuel consumption of the vehicle, the real total energy consumption of a deceleration $Kr_{Real,Verz,Einzel}$ [I] can be calculated as follows:

$$Kr_{Real,Verz,Einzel} = \frac{\max(s_{Ref,Verz} - s_{Real,Verz}; 0)}{100} * kr_{thKonst}(v_{Start,Verz}) + Kr_{Einspr,Verz}$$

where:
$kr_{thKonstr}(v_{Start,Verz})$: the fuel consumption in l/100 km for the constant-speed travel with the starting speed $v_{Start,Verz}$.

The energy consumption $kr_{thKonst}$ for a journey with the constant starting speed $v_{Start,Verz}$ can, for example, be calculated by a control device of the vehicle with the aid of driving resistances of the vehicle. A torque required at a wheel of the vehicle, and from that a required torque of the engine of the vehicle, can be determined by means of the driving resistances of the vehicle. The fuel consumption can be determined by means of a defined engine map making use of an associated rotation speed. The effect of auxiliary equipment on the consumption is to be taken into account in the form of a torque present at a generator and/or as a power drawn, for example, from an electric store. $Kr_{Einspr,Verz}$: the fuel consumption that is used during the deceleration of the vehicle. This contains, for example, the idling consumption as well as the additional consumption for the supply of auxiliary equipment.

The method 100 can further calculate 114 a reference energy consumption for the reference deceleration depending on the real energy consumption of the deceleration of the vehicle.

The reference energy consumption of the reference deceleration can be calculated depending on the types of deceleration. A reference deceleration can take place a coasting procedure with an engaged drive of the vehicle, a reference deceleration of a coasting procedure with a disengaged drive of the vehicle, and/or a reference deceleration with a propulsion cut-off of a combustion engine of the vehicle, and/or a reference deceleration with recovery of the (partially) electric drive of the vehicle. The deceleration type that is to be used for the reference deceleration can, for example, be determined by means of a mapping of the operating strategy of the vehicle from the load and speed curve as well as the duration of the deceleration. When the drive is switched off, and during the propulsion operation (of combustion engines), the auxiliary equipment of the vehicle is to be taken into account. Additional idling losses may result when the drive is engaged. A deceleration with recovery feeds kinetic energy for example into an electrical store of the vehicle, whereby an "energy gain", or a negative consumption, initially results. The reference energy consumption of the reference deceleration can, alternatively, also be estimated by means of a temporal scaling of the determined consumption of the real deceleration. The temporal scaling takes into account the fact that the reference deceleration lasts longer than the real deceleration.

The energy-saving potential of a deceleration $Kr_{Pot,Verz,Einzel}$ can be calculated and/or provided 118 as the difference between the real total energy consumption $Kr_{Real,Verz,Einzel}$ and the calculated reference energy consumption $Kr_{Ref,Verz,Einzel}$:

$$Kr_{Pot,Verz,Einzel} = Kr_{Real,Verz,Einzel} - Kr_{Ref,Verz,Einzel}$$

The calculation of the energy-saving potential of a deceleration can additionally be carried out depending on one or a plurality of conditions. The calculation of the energy-saving potential can, for example, be carried out only when, for example, the reference deceleration is exceeded for a specified time interval, e.g. 0.5, 0.6, 0.7, 0.8, 0.9, 1.0, 1.1, . . . seconds. The energy-saving potentials of individual decelerations can, furthermore, be added together, in order to obtain a total energy-saving potential of decelerations $Kr_{Pot,Verz}$ of a journey with the vehicle up to the current point in time during the journey and/or until the end of the journey. The total energy-saving potential can, for example, be provided with reference to distances, in that the total energy-saving potential is divided by the real distance covered since the beginning of the journey. A percentage excess consumption of an individual, inefficient deceleration can further also be calculated in that the reference energy consumption of a deceleration is related to the real energy consumption of a deceleration.

Additionally or alternatively, the control device of the vehicle can carry out a method in order to calculate the energy-saving potential of a deceleration suggestion $Kr_{Pot,VZA}$. The energy-saving potential of a deceleration suggestion can be defined as a preferably distance-related, additional energy consumption that results from ignoring or not following one or a plurality of deceleration suggestions. A deceleration suggestion can, for example, be a signal to a driver to initiate or carry out a defined deceleration procedure in order to reach a defined deceleration target. A deceleration suggestion can, for example, signal to begin a coast-down procedure, a coasting procedure and/or a recovery procedure at a specified time in order to achieve efficiently a new, specified target speed as the deceleration target. The new, specified target speed can, for example, be determined by a speed limit that will soon apply, by an upcoming bend, roundabout, crossing, traffic light phase and/or similar road and/or traffic-related features.

If the driver does not follow the deceleration suggestion, or only does so with delay, an excess consumption can result from the deceleration actually carried out by the driver in comparison with the deceleration proposed in the deceleration suggestion. This excess consumption can be calculated quantitatively and provided to the driver as an energy-saving potential of a deceleration suggestion. The calculation of the energy-saving potential of a deceleration suggestion is described in detail below. A control device of the vehicle can carry out the calculation if the driver does not follow a deceleration suggestion provided, or only does so with a delay. The control device can, further, also calculate the energy-saving potential during the journey for the distance covered up to the current time point, and provide it to the driver of the vehicle. The calculation of the energy-saving potential of a deceleration suggestion can be carried out on the control device of the vehicle in order to calculate the energy-saving potential in real time.

As already described above, the calculation of the energy-saving potential of a deceleration suggestion can be carried out depending on one or a plurality of conditions on the control device of the vehicle. The calculation of the energy-saving potential of a deceleration suggestion can, for example, be carried out under one or a plurality of the following conditions on the control device of the vehicle:

A deceleration suggestion has been present for a defined interval of time, e.g. 1 second, and has been ignored by the driver of the vehicle. Ignoring a deceleration suggestion can, for example, be detected in that a driving pedal position during an indicated deceleration suggestion is greater than zero at an arbitrary point in time, but at least for a defined time interval, e.g. 1 s, after first display, i.e. the driving pedal is pressed by the driver.

Optionally: There is no vehicle ahead driving on the same lane that is significantly slower and/or that requires a braking procedure.

The method for calculating the energy-saving potential of a deceleration suggestion can be carried out by the control device of the vehicle and comprise the following steps:

The method can provide a deceleration suggestion to the driver of the vehicle. The provision of the deceleration suggestion can be made through known methods. The deceleration suggestion can, for example, be provided through a deceleration assistant as is known from the prior art. The deceleration suggestion can, for example, comprise a deceleration target, e.g. a speed reduction, a speed limit, and/or an entrance into a traffic roundabout, a crossing or a bend.

When the deceleration suggestion is provided, a starting time point $t_{Start}$ can be determined as the point in time at which the deceleration suggestion was provided to the driver of the vehicle. A reaction time of the driver can, for example, be taken into account when determining the starting time point, so that the starting time point can be delayed by the reaction time of the driver. The method can, furthermore, determine and ending time point $t_{Ende}$ of the deceleration suggestion. The ending time point is preferably the point in time at which the deceleration target is reached and/or the point in time at which the deceleration suggestion is withdrawn. The vehicle speed $v_{1st,VZA\_Start}$ can be determined at the starting time point $t_{Start}$. A target speed $v_{VZA\_Ziel}$ of the deceleration can be defined depending on the deceleration target. The values of the target speed can, for example, be stored as predefined magnitudes on the control device. Depending on the deceleration target, a predefined target speed can be determined by reading out a corresponding value from the memory of the control device. If the deceleration target is a traffic roundabout, the target speed can, for example, be 45 km/h. If the deceleration target is a speed limit, the speed limit, or the speed limit plus a predefined value, e.g. 5 km/h, can be selected as the target speed.

If the driver of the vehicle ignores or does not follow the deceleration suggestion that has been provided, the method can determine a real energy consumption between the starting time point and the ending time point of the deceleration suggestion. In order to determine the real energy consumption, for example a currently injected fuel consumption $Kr_{Real,VZA}$ can be added up until the vehicle has reached the ending time point of the deceleration suggestion.

The method can, furthermore, calculate a reference energy consumption of a reference deceleration depending on the deceleration suggestion. The reference deceleration is here an efficient deceleration with which the deceleration target of the deceleration suggestion can be achieved. The reference deceleration can be determined by means of a reference travel. The starting time point in the reference travel is the point in time at which the driving pedal has just ceased to be actuated after the first presence of a deceleration suggestion. The travel time $\Delta t_{VZA,Ziel}$ [s] of the reference travel with the reference deceleration until the target speed $v_{VZA,Ziel}$ is reached can, for example, be determined by using a specified characteristic map depending on the starting speed and the target speed and/or using a coast-down curve of the vehicle over time by means of vehicle-specific resistances. In simplified fashion, the travel time can be calculated through a division of the distance to the target $s_{VZA,Ziel}$ and the arithmetic mean of the starting speed and the target speed.

The reference deceleration can be realized by the vehicle in different ways. The reference energy consumption resulting from this, e.g. a reference fuel consumption, can thus differ depending on the reference deceleration. A reference fuel consumption $Kr_{Ref,VZA}$ [l] can, for example, depend on whether following the deceleration suggestion would have led to a coasting procedure with the combustion engine switched off or disengaged or whether a propulsion cut-off and/or a recovery would have resulted.

If, in the case of the deceleration suggestion being followed, or in the case of an efficient reference deceleration, a coasting procedure with the engine switched on would have resulted, an idling consumption $kr_{LL}$ [l/h] above all is relevant. When multiplied by the deceleration duration $\Delta t_{VZA,Ziel}$, the reference fuel consumption or the reference energy consumption $Kr_{Ref,VZA}$ can be calculated. The reference fuel consumption or the reference energy consumption can take a power of auxiliary equipment into account. A power of a generator acting on the combustion engine during a real travel can, for example, be multiplied by the average relative efficiency of the combustion engine, and then related to the calorific value of the fuel. Multiplied by the time of the deceleration, the fuel consumption caused by the generator can be determined. The reduction or increase in the charge status of electric stores is also to be taken into account by means of a corresponding efficiency chain. If a coasting procedure with the engine switched off would have resulted from following the deceleration suggestion, only the quantity of energy required by the auxiliary equipment then has to be taken into account for the reference deceleration. Alternatively, the reference consumption can also be overlooked, depending on the desired accuracy. If the reference deceleration takes place with propulsion cut-off, i.e. with the combustion engine switched on, gear engaged and clutch engaged, it can in a simplified manner be assumed that no fuel is injected. The supply of the auxiliary equipment can, depending on the vehicle, also be performed by the combustion engine, and also the generator, being "dragged along". A deceleration with recovery feeds a portion of the kinetic energy of the vehicle back into its, for example electric, stores. The recovered quantity of energy thus here corresponds to a negative consumption which can be calculated by means of a balance of the charge state, and taking into account the efficiency chain of the drive in battery-electric vehicles, or the efficiency chain for charging the electrical store in conventional vehicles.

The method can determine a differential energy consumption between the real energy consumption $Kr_{Real,VZA}$ and the reference energy consumption $Kr_{Ref,VZA}$. The energy-saving potential $Kr_{Pot,VZA,Einzel}$ [l/100 km] of a single deceleration suggestion can be calculated and/or provided by making use of the differential energy consumption. The method can, furthermore, add up the energy-saving potentials of individual deceleration suggestions in order to obtain a total energy-saving potential $Kr_{Pot,VZA}$ of all the deceleration suggestions of a journey that were ignored or not followed. The energy-saving potential can be given in relation to the distance or as a percentage, in that the energy-saving potential calculated above is modified appropriately.

The method can, furthermore, verify deceleration suggestions. The method can, for example, use a camera sensor in order to verify whether a deceleration target of a deceleration suggestion is correct. Traffic signs or traffic junctions can, for example, be analyzed by means of the camera sensor, and compared with the deceleration target. If the deceleration suggestion or the deceleration target of the deceleration suggestion cannot be verified, a corresponding energy-saving potential can be no longer taken into account in the calculation.

The method described above for supporting an energy-efficient deceleration of a vehicle can be applied to vehicles with a combustion engine, vehicles with an electric drive, as well as vehicles with a drive made up of a combination of combustion engine and electric drive. Vehicles with a purely electric drive differ from vehicles with a combustion engine in terms of the energy consumption in that an electric energy requirement arises instead of a fuel requirement. The calculation logic for the saving potential of the deceleration is identical for purely electric vehicles. Instead of a fuel consumption, however, the electric energy requirement is determined. By means of calculating the speed of rotation and the torque at the wheel and at the drive motor, the electric energy requirement of the electric motor can be determined, taking its efficiency into account. Losses caused by the power electronics and the high-voltage store are also to be taken into account. An air-conditioning compressor and heating are, in relevant cases, implemented electrically. The definition of the reference deceleration can in addition be defined for electrified vehicles along the maximum recovery boundary, so that all the decelerations are only evaluated as inefficient when the mechanical brake is used. For plug-in hybrid vehicles, distances traveled with the combustion engine and electrically can be evaluated separately. In the calculation of the potentials, it is fundamental that the special features of the electric drive train are always also included in the calculation, since even when traveling with the combustion engine, one or more electric motors can provide support or be operated as generators. This means that, depending on the accuracy desired, an energy balance related to the high-voltage store is necessary in every calculation of the potential.

LIST OF REFERENCE SIGNS

100 Method
102 Determination of a reference deceleration
104 Determination of a starting time point
106 Determination of a real energy consumption
108 Calculation of a reference time
110 Calculation of an energy consumption for a differential distance
112 Calculation of a real total energy consumption
114 Calculation of a reference energy consumption
116 Provision of an energy-saving potential The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a driver-assistance system in support of an energy-efficient deceleration of a vehicle, the method comprising:
determining a reference deceleration depending on a current speed or a speed profile of the vehicle;
determining a starting time point and a starting speed of a deceleration of the vehicle;
determining a real energy consumption and a real distance between the starting time point and a current time point and/or an ending time point of the deceleration;
calculating a reference time and a reference distance for a deceleration with the reference deceleration between the starting speed and the current speed and/or a speed at the ending time point of the vehicle;
calculating an energy consumption for a differential distance from the real distance and the reference distance;
calculating a real total energy consumption as a sum of the real energy consumption of the deceleration and the energy consumption for the differential distance;
calculating a reference energy consumption for the reference deceleration from the starting speed to the current and/or speed at the ending time point of the vehicle depending on a predefined deceleration type of the reference deceleration and/or depending on the real energy consumption of the deceleration; and
providing, via the driver-assistance system, an energy-saving potential based on a difference between the real total energy consumption and the reference energy consumption,
wherein (a) the starting time point of the deceleration is a point in time at which the reference deceleration is first exceeded for a predefined interval of time, and a brake pedal is pressed contemporaneously, and/or (b) the starting speed is the current speed of the vehicle at the starting time point of the deceleration.

2. The method as claimed in claim 1, wherein the reference deceleration is corrected depending on a current gradient of a roadway of the vehicle.

3. The method as claimed in claim 1, wherein the reference energy consumption is determined for one of the following, predefined deceleration types of the reference deceleration:
reference deceleration of a coasting procedure with an engaged drive of the vehicle;
reference deceleration of a coasting procedure with a disengaged drive of the vehicle;
reference deceleration with a partial propulsion cut-off of the drive of the vehicle; and/or
reference deceleration with recovery of kinetic energy into a store internal to the vehicle.

4. The method as claimed in claim 2, wherein the reference energy consumption is determined for one of the following, predefined deceleration types of the reference deceleration:
reference deceleration of a coasting procedure with an engaged drive of the vehicle;
reference deceleration of a coasting procedure with a disengaged drive of the vehicle;
reference deceleration with a partial propulsion cut-off of the drive of the vehicle; and/or
reference deceleration with recovery of kinetic energy into a store internal to the vehicle.

5. The method as claimed in claim 1, wherein the energy consumption of the differential distance is calculated for a constant-speed travel with the starting speed.

6. The method as claimed in claim 1, the method furthermore comprises:
providing a deceleration suggestion comprising a deceleration target to a driver of the vehicle;
determining a starting time point and the ending time point of the deceleration suggestion; and
if the driver of the vehicle ignores the deceleration suggestion provided, the method further comprises:
determining the real energy consumption between the starting time point of the deceleration suggestion and the ending time point of the deceleration suggestion;
determining the reference energy consumption of the reference deceleration depending on the deceleration suggestion and the specified deceleration type of the reference deceleration; and
calculating a differential energy consumption between the real energy consumption and the reference energy consumption; and
providing an energy-saving potential for the deceleration suggestion provided making use of the differential energy consumption.

7. The method as claimed in claim 2, the method furthermore comprises:
providing a deceleration suggestion comprising a deceleration target to a driver of the vehicle;
determining a starting time point and the ending time point of the deceleration suggestion; and if the driver of the vehicle ignores the deceleration suggestion provided, the method further comprises:
  determining the real energy consumption between the starting time point of the deceleration suggestion and the ending time point of the deceleration suggestion;
  determining the reference energy consumption of the reference deceleration depending on the deceleration suggestion and the specified deceleration type of the reference deceleration; and
  calculating a differential energy consumption between the real energy consumption and the reference energy consumption; and
  providing an energy-saving potential for the deceleration suggestion provided making use of the differential energy consumption.

8. The method as claimed in claim 3, the method furthermore comprises:
  providing a deceleration suggestion comprising a deceleration target to a driver of the vehicle;
  determining a starting time point and the ending time point of the deceleration suggestion; and
  if the driver of the vehicle ignores the deceleration suggestion provided, the method further comprises:
    determining the real energy consumption between the starting time point of the deceleration suggestion and the ending time point of the deceleration suggestion;
    determining the reference energy consumption of the reference deceleration depending on the deceleration suggestion and the specified deceleration type of the reference deceleration; and
    calculating a differential energy consumption between the real energy consumption and the reference energy consumption; and
    providing an energy-saving potential for the deceleration suggestion provided making use of the differential energy consumption.

9. The method as claimed in claim 1, the method furthermore comprises:
  providing a deceleration suggestion comprising a deceleration target to a driver of the vehicle;
  determining a starting time point and the ending time point of the deceleration suggestion; and
  if the driver of the vehicle ignores the deceleration suggestion provided, the method further comprises:
    determining the real energy consumption between the starting time point of the deceleration suggestion and the ending time point of the deceleration suggestion;
    determining the reference energy consumption of the reference deceleration depending on the deceleration suggestion and the specified deceleration type of the reference deceleration; and
    calculating a differential energy consumption between the real energy consumption and the reference energy consumption; and
    providing an energy-saving potential for the deceleration suggestion provided making use of the differential energy consumption.

10. The method as claimed in claim 6,
  wherein the ending time point of the deceleration suggestion is a point in time at which the deceleration target of the deceleration suggestion is reached and/or
  wherein the ending time point of the deceleration suggestion is a point in time at which the deceleration suggestion is no longer provided.

11. The method as claimed in claim 7,
  wherein the ending time point of the deceleration suggestion is a point in time at which the deceleration target of the deceleration suggestion is reached and/or
  wherein the ending time point of the deceleration suggestion is a point in time at which the deceleration suggestion is no longer provided.

12. The method as claimed in claim 8,
  wherein the ending time point of the deceleration suggestion is a point in time at which the deceleration target of the deceleration suggestion is reached and/or
  wherein the ending time point of the deceleration suggestion is a point in time at which the deceleration suggestion is no longer provided.

13. The method as claimed in claim 12,
  wherein the ending time point of the deceleration suggestion is a point in time at which the deceleration target of the deceleration suggestion is reached and/or
  wherein the ending time point of the deceleration suggestion is a point in time at which the deceleration suggestion is no longer provided.

14. A driver-assistance system for supporting a deceleration of a vehicle with energy consumption control, the system comprising:
  a control device; and
  an energy consumption assistant which is executed on the contrail device, wherein the energy consumption assistant is configured to:
    determine a reference deceleration depending on a current speed or a speed profile of the vehicle;
    determine a starting time point and a starting speed of a deceleration of the vehicle;
    determine a real energy consumption and a real distance between the starting time point and a current time point and/or an ending time point of the deceleration;
    calculate a reference time and a reference distance fora deceleration with the reference deceleration between the starting speed and the current speed and/or a speed at the ending time point of the vehicle;
    calculate an energy consumption for a differential distance from the real distance and the reference distance;
    calculate a real total energy consumption as a sum of the real energy consumption of the deceleration and the energy consumption for the differential distance;
    calculate a reference energy consumption for the reference deceleration from the starting speed to the current and/or speed at the ending time point of the vehicle depending on a predefined deceleration type of the reference deceleration and/or depending on the real energy consumption of the deceleration; and
    provide an energy-saving potential based on a difference between the real total energy consumption and the reference energy consumption,
    wherein (a) the starting time point of the deceleration is a point in time at which the reference deceleration is first exceeded for a predefined interval of time, and a brake pedal is pressed contemporaneously, and/or (b) the starting speed is the current speed of the vehicle at the starting time point of the deceleration.

15. A vehicle comprising a driver-assistance system for supporting a deceleration of a vehicle with energy consumption control, the system comprising:
  a control device; and
  an energy consumption assistant which is executed on the control device, wherein the energy consumption assistant is configured to:

determine a reference deceleration depending on a current speed or a speed profile of the vehicle;

determine a starting time point and a starting speed of a deceleration of the vehicle;

determine a real energy consumption and a real distance between the starting time point and a current time point and/or an ending time point of the deceleration;

calculate a reference time and a reference distance for a deceleration with the reference deceleration between the starting speed and the current speed and/or a speed at the ending time point of the vehicle;

calculate an energy consumption for a differential distance from the real distance and the reference distance;

calculate a real total energy consumption as a sum of the real energy consumption of the deceleration and the energy consumption for the differential distance;

calculate a reference energy consumption for the reference deceleration from the starting speed to the current and/or speed at the ending time point of the vehicle depending on a predefined deceleration type of the reference deceleration and/or depending on the real energy consumption of the deceleration; and provide an energy-saving potential based on a difference between the real total energy consumption and the reference energy consumption, wherein (a) the starting time point of the deceleration is a point in time at which the reference deceleration is first exceeded for a predefined interval of time, and a brake pedal is pressed contemporaneously, and/or (b) the starting speed is the current speed of the vehicle at the starting time point of the deceleration.

* * * * *